Feb. 7, 1956   F. L. WILLRODT   2,733,821
BALE LOADER

Filed Jan. 14, 1953   7 Sheets-Sheet 1

Fig.1.

INVENTOR.
Fred L. Willrodt.
BY
Fishburn & Mullendore
ATTORNEYS.

Feb. 7, 1956 F. L. WILLRODT 2,733,821
BALE LOADER
Filed Jan. 14, 1953 7 Sheets-Sheet 6

Fig. 9.

INVENTOR.
Fred L. Willrodt.
BY Fishburn & Mullendor
ATTORNEYS.

INVENTOR.
Fred L. Willrodt.

United States Patent Office 2,733,821
Patented Feb. 7, 1956

2,733,821

BALE LOADER

Fred L. Willrodt, Omaha, Nebr.

Application January 14, 1953, Serial No. 331,173

15 Claims. (Cl. 214—359)

This invention relates to loaders adapted to be attached to a vehicle for picking up bales and the like from a field and lifting them onto the vehicle; the principal object being to provide a simple, lightweight device that is easily trailed alongside the vehicle and readily disconnected therefrom when the vehicle is loaded.

A further object of the invention is to provide a loader with a bale gripping mechanism that is automatically actuated on contact with a bale and which sets the elevating mechanism in action responsive to delayed movement of the bale relative to forward movement of the loader.

Other objects of the invention are to provide a loader with means for guiding and straightening bales with respect to the grippers; to provide means for automatically returning the grippers after a bale has been discharged into the vehicle; to provide a check for controlling return movement of the gripper mechanism; and to provide a loader which may be trailed at high speeds in the rear of a motor vehicle when moving the loader from one place of operation to another.

In accomplishing these and other objects of the invention, hereinafter pointed out, I have provided improved structure, the preferred form of which is illustrated in the accompanying drawings, wherein.

Figure 1:
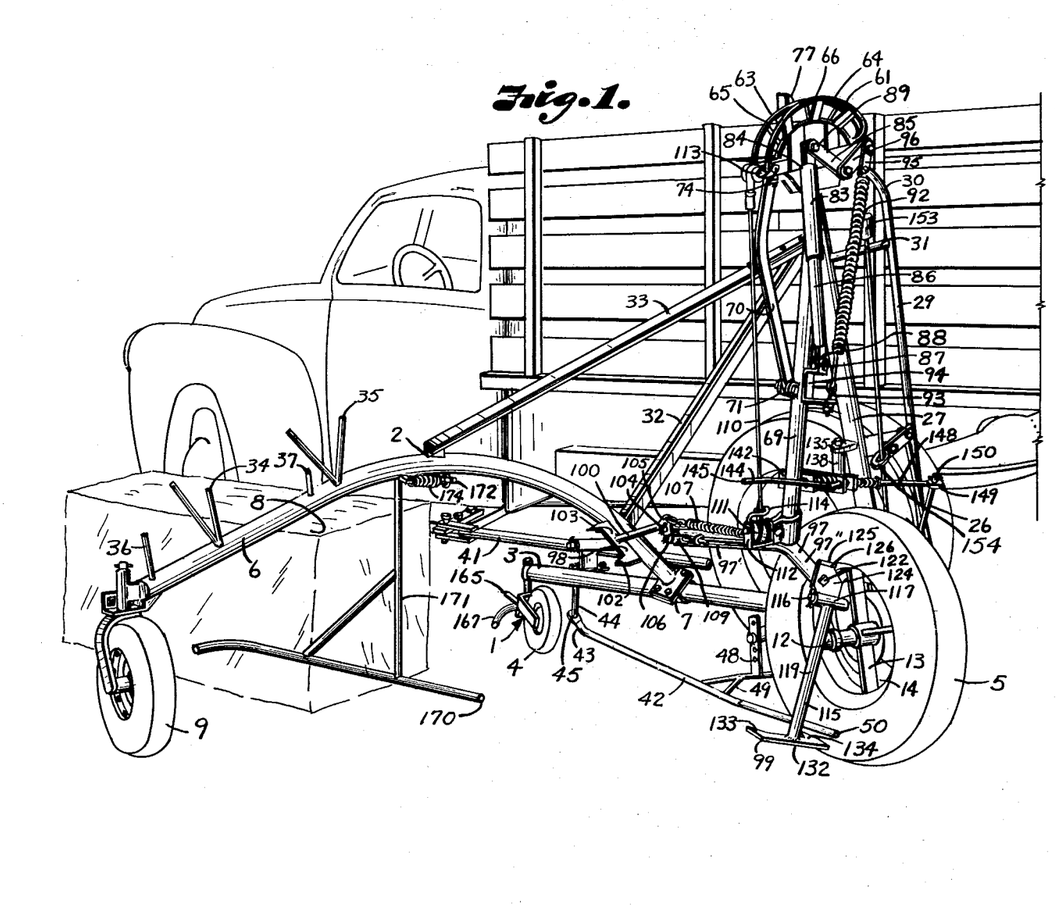
Fig. 1 is a perspective view of a loader constructed in accordance with the present invention.
Figure 2:
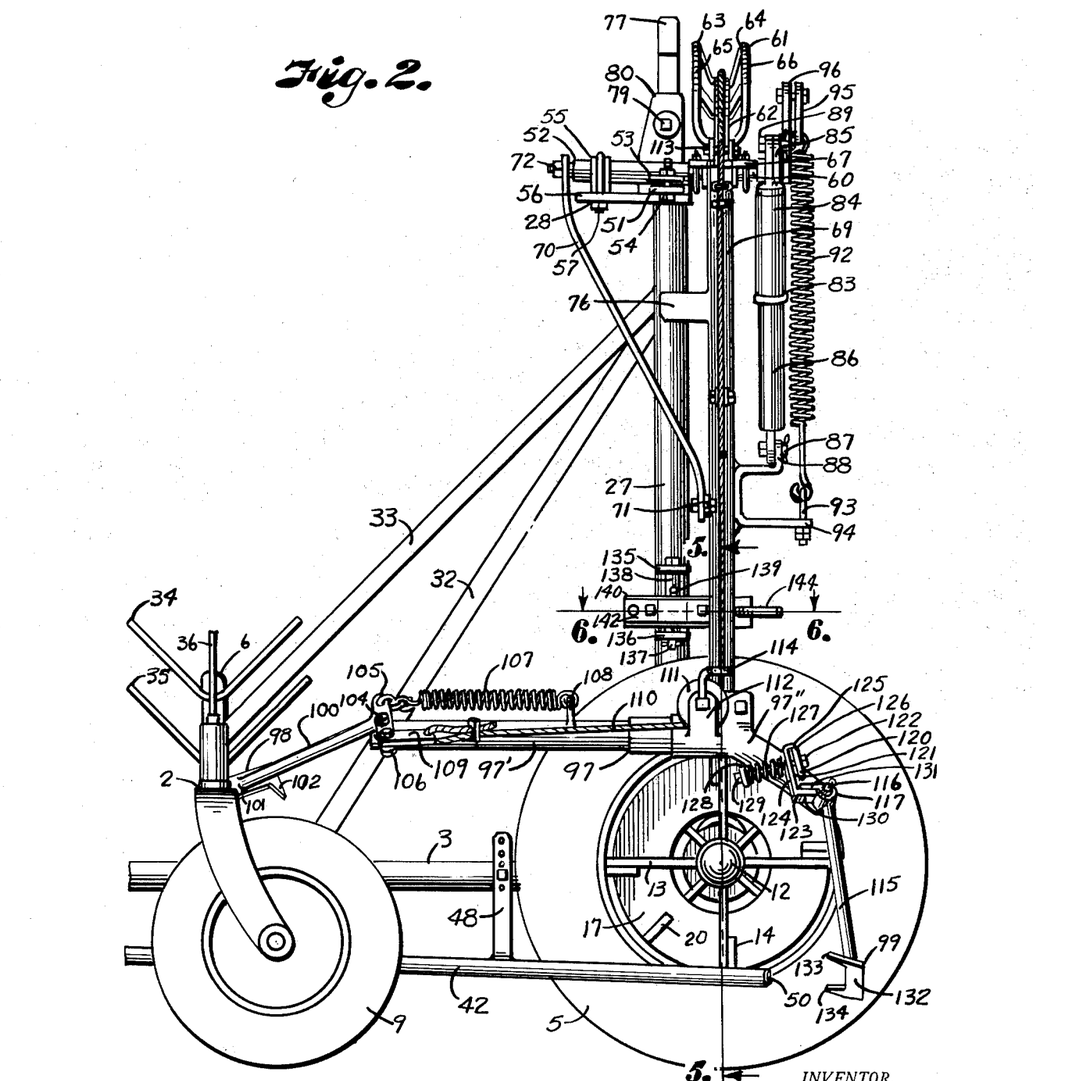
Fig. 2 is a side elevational view of the loader.

Referring more in detail to the drawings:

1 designates a loader constructed in accordance with the present invention and which has a mobile frame 2. The frame 2 includes a longitudinal member 3 supported at its forward end by a caster wheel 4 and its rear end by a main traction wheel 5. The frame also includes a laterally extending arch 6 that is attached to the longitudinal member 3 by a clamp 7 and which curves upwardly and then downwardly as shown in Figs. 1 and 2 to form a passageway 8 thereunder. The outer end of the arch 6 carries a caster wheel 9 which cooperates with the wheels 4 and 5 to provide tripoint support of the frame.

The main traction wheel 5 is journalled on an axle 10 that projects laterally from a rearward extension 11 of the longitudinal member 3. The wheel 5 includes a hub 12 and radially extending spokes 13 which carry driving lugs 14 that project from the spokes on the side of the wheel facing the longitudinal member 3. Rotatable on the axle 10 and adapted to be moved to and from driven engagement with the lugs of the main traction wheel is a reel or pulley 15 having a drum portion 16 and spaced annular side flanges 17 and 18 for winding a cable 19, later described. Fixed to the flange 17 and projecting therefrom in the direction to engage one or more of the lugs 14 are lugs 20. Fixed to the opposite side of the reel is a collar 21 having spaced flanges 22 and 23 forming an annular way 24 for the forked end 25 of a shifting lever 26 by which the reel may be moved in the direction of the main wheel for engaging the lugs 20 with one or another of the lugs 14 so that rotation of the main wheel 5 by forward movement of the loader rotates the reel 15 for winding the cable 19 as later described to provide the power for the gripping and lifting mechanisms of the machine as later described.

Figure 3:
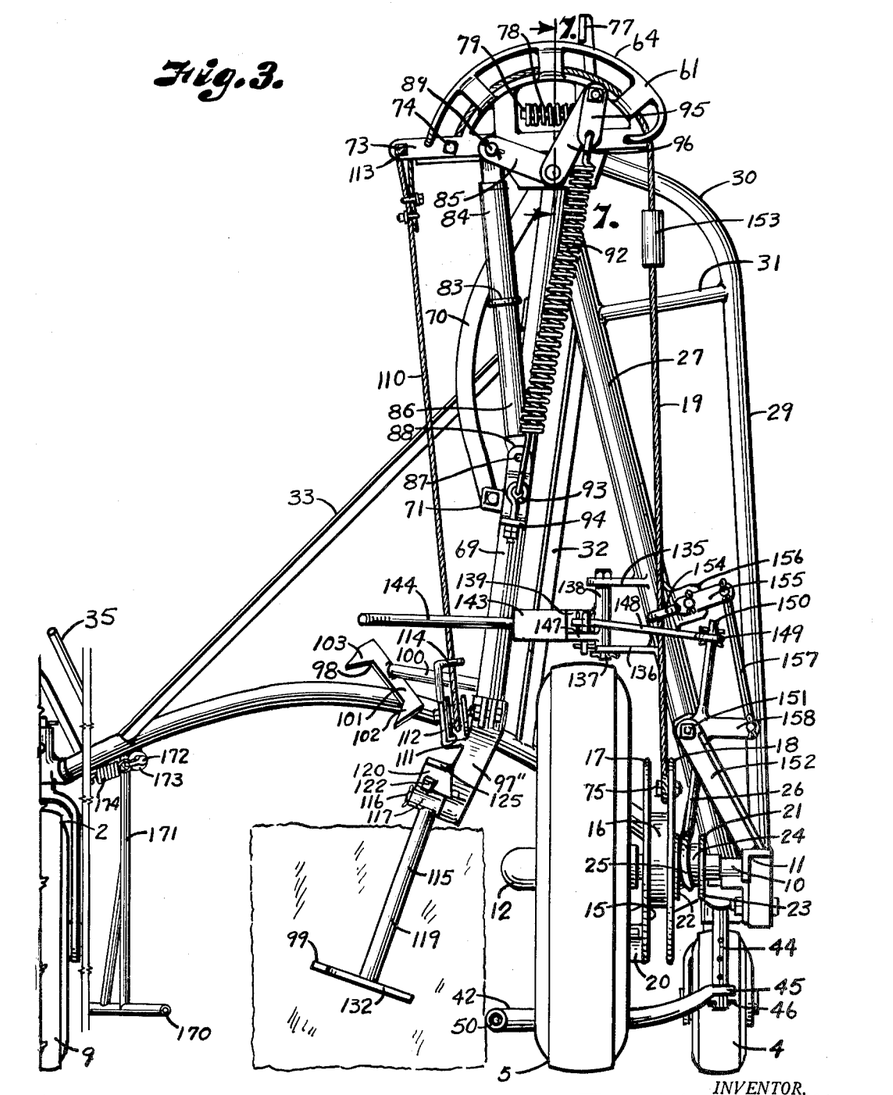
Fig. 3 is a rear end elevational view of the loader showing a bale in position to be engaged by the grippers.
Figure 4:
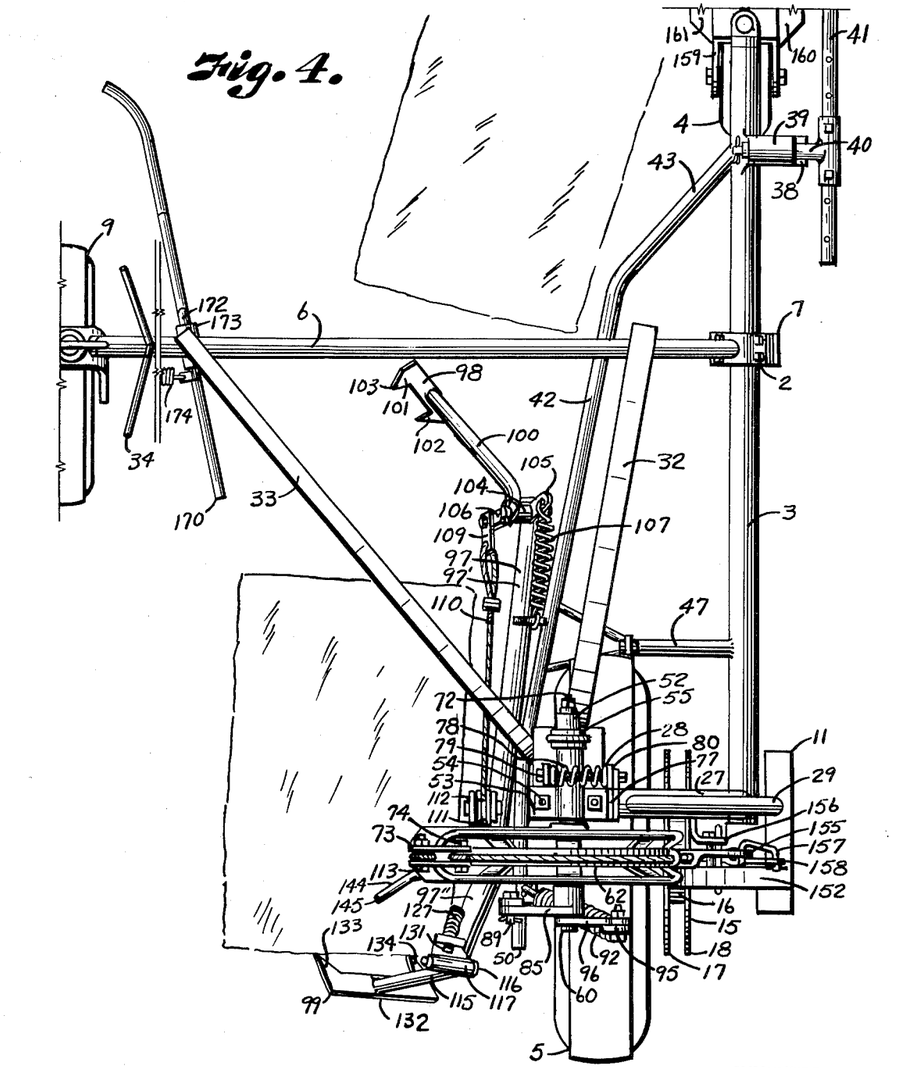
Fig. 4 is a plan view of the loader with the grippers in position for engaging a bale and another bale being guided into gripping position.
Figure 11:
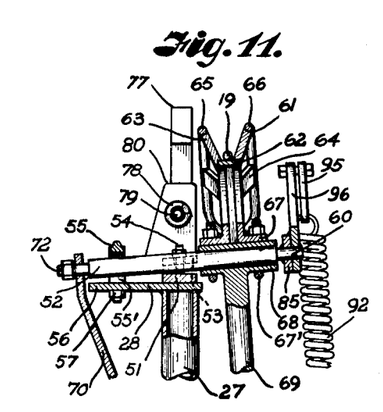
Fig. 11 is a section corresponding to the location of the section for Fig. 7 but showing the pivoting of the shaft as when the arm is moved rearwardly to set the gripping and lifting mechanisms in motion.
Figure 12:
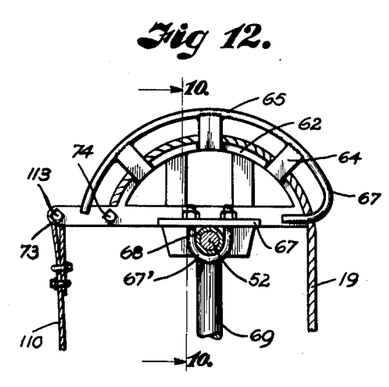
Fig. 12 is a section on the line 12—12 of Fig. 10.
Figure 13:
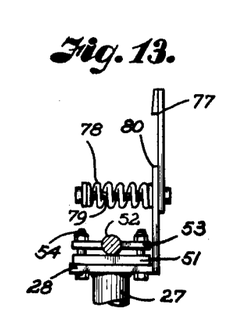
Fig. 13 is a section on the line 13—13 of Fig. 10.
Figure 14:
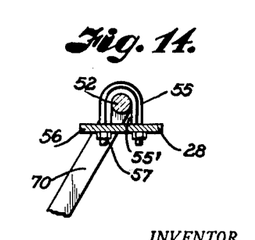
Fig. 14 is a section on the line 14—14 of Fig. 10.

Extending upwardly from the longitudinal member 3 slightly forwardly of the axle 10 is a main upright member or standard 27 which has its upper end terminating over the path of the main wheel and carries a head plate or bracket 28 that is fixed rigidly to the upper end, as best shown in Fig. 11. The member 27 is braced laterally by an upright 29 having its lower end fixed to the extension 11 at a point where the extension connects with the rear end of the longitudinal member 3. The member 29 extends upwardly and has a curving terminal 30 which connects with the upright member or standard 27 as best shown in Figs. 3 and 4. The members 27 and 29 are interconnected below the curving terminal 30 by a tie bar 31. The member 27 is braced in a forward direction by a stay 32 having its upper end fixed to the member 27 near the tie bar 31 and its lower end fixed to the arch member 6 at a point substantially in alignment with the outer face of the main traction wheel. The upright is also connected with a mid portion of the arch member by a brace 33 which connects with the member 27 near the connecting point of the stay 32 to provide for stability of the upright member in all directions.

In order to provide for lateral stability on the side of the frame opposite the caster wheel 9, the outer end of the arch 6 carries forks 34 and 35 which cooperate with a rod 36 and a spike 27 to retain a weight, such as a bale of hay or the like, that may be placed within the branches of the forks 34 and 35 with the outer end bearing against the rod 36.

The forward end of the longitudinal member 3 has a lateral extension 38 that carries a bearing sleeve 39 in which is pivotally mounted a lateral pin 40 on a draft bar 41. The draft bar 41 is adjustably connected relatively to the pivot pin 40 to facilitate attachment to the side of a truck which is to be loaded with bales of hay or the like.

The bales of hay, when discharged from a hay baler, may roll out of alignment or assume angular positions in the windrow. It is, therefore, desirable to guide the bales so that they will pass to a position along the outer side of the main traction wheel from where they are picked up by an elevating mechanism and discharged onto the bed of the truck to be loaded. The bale guide includes a rail 42 which is arranged at an angle relative to the forward movement of the loader and has a more angularly arranged forward end 43 that is connected with a pin 44 which depends from the underside of the longitudinal member 3 as best shown in Fig. 3. The forward end of the rail has an eye 45 that sleeves over the pin 44 and is adjustably supported relative to the ground by a cotter pin or the like 46 that is extended through one of a series of openings in the pin 44 as best shown in Fig. 3. The rear end of the rail is supported at a point just forwardly of the main wheel from an arm 47 that extends laterally from the longitudinal member 3 for adjustably connecting an arm 48 that extends upwardly from a V-shaped bracket 49 on the side of the guide rail 42. The rear end 50 of the guide rail terminates along the face side of the main wheel 5 as shown in Fig. 2, so that the bales are guided into the position where they are engaged by an elevating mechanism, now to be described.

Fixed to and extending transversely of the head plate 28 is a bar 51. Extending transversely of the bar 51 is a shaft 52 that is adapted to rock thereon in a fore and aft direction upon engagement of a bale with the elevating mechanism as later described. The shaft 52 has laterally extending ears 53 at a point intermediate its ends that are loosely connected with the ends of the bar 51 and head plate 28 by fastening devices, such as bolts 54. The bolts are tightened sufficiently to secure the shaft 52 thereon but they are left slightly loose to permit pivoting or teetering of the shaft on the bar 51, as shown in Fig. 11. The forward end of the shaft 52 is guided for slight up and down movement in the slot 55' of a bracket 55 that is connected with a forward extension 56 of the head plate 28 by studs 57. The shaft 52 has a rearwardly projecting end 60 mounting a pulley segment or rocker 61 thereon. The rocker 61 has an arcuate track 62 for the cable 19 previously mentioned and has radial and outwardly extending webs 63 and 64 at opposite sides thereof for carrying spaced arcuate rails 65 and 66 that are coextensive with the cable track 62 to prevent displacement of the cable. The rocker member also includes substantially horizontal bars 67 that are fixed on a sleeve 68 by U bolts 67'. The sleeve 68 is sleeved on the shaft 52 and oscillates thereon. Fixed to and depending from the sleeve 68 is an arm 69.

The arm 69 is braced with respect to the rock shaft 52 by a member 70 having one end connected with an ear 71 projecting from the arm 69 and having its other end connected with the forward end 72 of the shaft 52 as indicated at Figs. 2, 7, 10, and 11. One end of the cable 19 is connected between forwardly extending terminals 73 of the rocker by a transverse bolt 74. The other end of the cable is connected with a flange 18 of the reel 15 by a bolt 75 so that when the reel is in position to be rotated by the main traction wheel, the rocker is moved in a clockwise direction on the shaft 52 as shown in Fig. 3 to actuate a gripping means later described and to effect elevation of the arm 69 through approximately 180°.

During final upward swinging movement of the arm 69 a lug 76 thereon engages a bumper 77. The bumper 77 is pivotally connected to the head plate 28 and compresses a spring 78 that is mounted on a bolt 79 extending through the bumper and a cooperating stop 80 that is fixed on the head 28. One end of the spring engages the stop 80 and the other end engages the washer on the bolt 79 to normally retain the bumper 77 in contact with the stop 80. With this structure contact of the lug 76 with the bumper effects compression of the spring 78 so that the stored up energy in the spring starts return movement of the arm 69 to its original position. The return speed of the arm 69 is under control of a check 83. A check 83 may be of the telescoping type and has one member 84 thereof pivotally connected with an arm 85 fixed to the rear end of the shaft 52, the other member 86 being connected with the bracket 88 on the arm 69 by a pin 87. The member 84 of the check is pivotally connected by a pin 89 with the crank 85.

The action of the check may be supplemented by a spring 92 having one end connected with an eye 93 that is fixed to a bracket 94 which extends from the arm 69 as shown in Figs. 2 and 3. The other end of the spring is connected through a link 95 with an arm 96 that is also fixed to the rear end of the shaft 52.

Carried on the free end of the arm 69 is a longitudinally extending arm 97 having a forwardly extending end 97' and a rearwardly and downwardly directed end 97" upon which are pivotally mounted bale engaging members 98 and 99 respectively. The member 98 engages the forward end of the bale and includes an arm 100 having a head 101 on the free end thereof that is provided with prongs 102 and 103 for engaging in the end of the bale. The opposite end of the arm 100 is pivotally mounted on a stud 104 that is carried by the forward end 97' of the arm 97. The member 98 has oppositely directed arms 105 and 106. The arm 105 is connected with one end of a coil spring 107 that has its opposite end connected with a lug 108 on the arm 97 to retain the bale engaging member in retracted position as shown in Fig. 2. The other arm 106 is pivotally connected by a link 109 with the end of a cable 110 that extends along the arm 97 and under a pulley 111. The pulley 111 is mounted on the arm 97 in a bracket 112 so that the cable 110 extends upwardly in alignment with the depending arm 69 to connect with a crossbolt 113 that is carried by the ears 73, as best shown in Figs. 2 and 3. The vertical run of the cable is guided with respect to the pulley 111 by an eye 114 that is attached to the bracket 112 as shown in Figs. 2 and 3.

The other bale gripping member 99 includes a similar arm 115 that is pivotally mounted on a pin 116 projecting laterally from the terminal 97" of the arm 97, the pin 116 extending through a bearing sleeve 117 which is fixed to the arm 115 in a position so that the arm extends downwardly and outwardly with respect to the traction wheel and in a position to engage the end of a bale that rides along the guide rail 42 previously described. The arm 115 is provided with a safety release or trip 120 which includes a lug 121 that extends laterally from the arm 97" to carry a bolt 122 supporting a latch member 123. The latch member 123 has a body portion 124 which has an opening therein to pass the shank of the bolt 122. The body portion of the latch has a hook 125 that engages over and pivots upon the upper edge 126 of the lug 121 responsive to a spring 127 that has one end bearing against the latch and its opposite end against a washer 128 that is backed by the head of the bolt 129 to retain the spring in compression and the hook end of the latch member in engagement with the lug 121.

The latch member also includes a tail portion 130 that engages an arm 131 projecting from the sleeve 117 of the gripping member 99. It is obvious that the spring 127 normally retains the portion 13 of the latch member in engagement under the arm 131 to yieldingly retain the gripping member with the head 132 in position for engaging the end of a bale as shown in Fig. 3. The head 132 has prongs 133 and 134 corresponding with the prongs of the other bale gripping member.

Figures 5, 6:
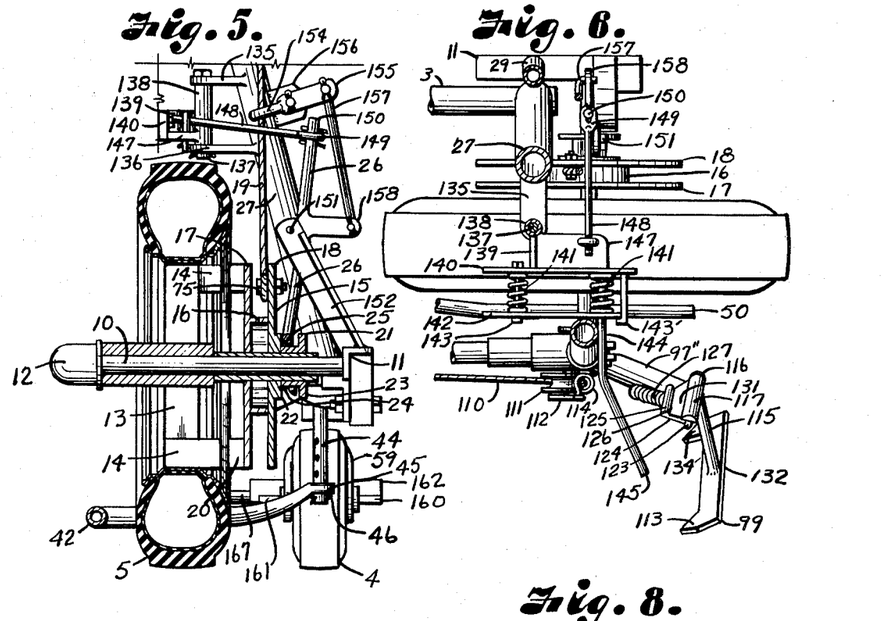
Fig. 5 is a vertical section on the line 5—5 Fig. 2 particularly illustrating the drive and drive engaging parts.
Fig. 6 is a cross section on the line 6—6 of Fig. 2.

Projecting from the upright 27 at a point above the main wheel are vertically spaced lugs 135 and 136 which carry a pivot pin 137 extending through a sleeve portion 138 of a member 139 that swings horizontally relative to the axis of the pin 137. The member 139 has a longitudinally extending plate 140 forming a seat for coil springs 141 that have their opposite ends abutting a bumper bar 142 against which the lower end of the arm 69 rests when the arm is in position shown in Figs. 2 and 3 of the drawings. The bumper is loosely supported on the plate 140 at one end by a fastening device 143, and at the other end by a hooked plate 143'. Carried by the plate 140 and extending through the bumper bar 142 is a rod 144 having a rearwardly angling terminal 145 which extends a substantial distance beyond the rest position of the arm 69 and which guides the arm into engagement with the bumper bar 142 upon return movement thereof, as later described. The springs 141 are sleeved on the bolt 143 and on the rod 144 (see Fig. 6). Thus when a bale is engaged by the spikes 133 and 134 of the gripper 99, forward movement of the gripper is stopped by the bale so that the depending arm swings rearwardly as the loader moves forwardly, with the shaft 52, rocking or teetering slightly on the bar 51. During this movement the rear end of the shaft 52 moves slightly upwardly and the forward end downwardly within the guide 55 as limited by the length of the slot 55'. This relative movement of the depending arm 69 with respect to the frame of the machine causes the arm 69, through engagement thereof with the rod 144 (see Fig. 6), to rock the member 139 on the pin 137, which rocking movement is for the purpose of actuating the shifting lever 26, as now to be described.

Extending from the member 139 is an arm 147 carrying a connection with a link 148. The opposite end of the link 148 has an eye 149 engaging the terminal 150 of the shifting lever 26. The shifting lever 26 is pivoted on a pin 151 that is carried on a bracket 152 which is fixed to the extension 11 of the longitudinal member of the frame. The reel 15 is moved in the opposite direction, to disengage the driving connection by a stop 153 that is fixed on the cable 19 in position to engage an eye 154 on a lever 155. The lever 155 is pivoted on an ear 156 that projects from the standard 27. The opposite end of the lever 155 is connected by a link 157 with an arm 158 on the shift lever 26 as best shown in Fig. 3.

Fixed to the fork 159 of the front caster 4 are forwardly extending arms 160 and 161 carrying a crossbar 162. Mounted on the crossbar over the arm 161 is a vertical pin 163. Mounted on the pin 163 is a sleeve 164 carrying a forwardly extending spike 165. Extending transversely of the sleeve 164 below the spike 165 are diametrically opposed arms 166 and 167. The arm 167 curves laterally and rearwardly for contact with a bale to effect movement of the spike 165 into the bale and effect shifting thereof away from the caster wheel 4. After passage of the bale the spike is returned to its normal position by a coil spring 168 having one end connected with the arm 166 and its other end connected to a pin 169.

The bales may tend to roll away from the grippers and this is prevented by a guide bar 170 that is carried by a supporting rod 171 which has a lateral terminal 172 pivoted within a bearing 173. The bearing 173 is fixed to the under side of the arch 6. The bar 170 is resiliently held in position by a spring 174.

Figure 7:
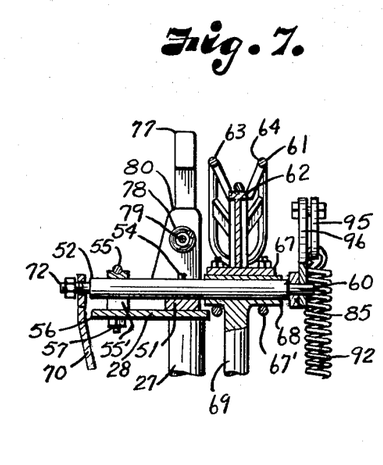
Fig. 7 is a section on the line 7—7 of Fig. 3.
Figure 8:
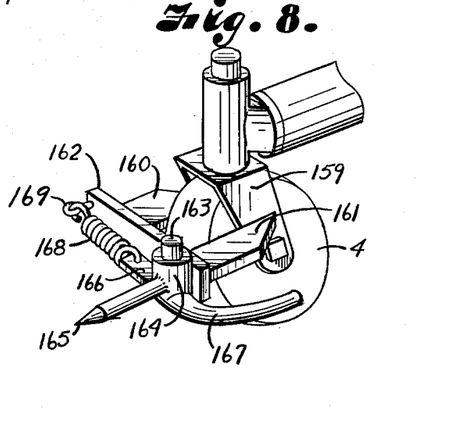
Fig. 8 is a detail perspective view of the front caster wheel illustrating the bale straightener.
Figure 9:
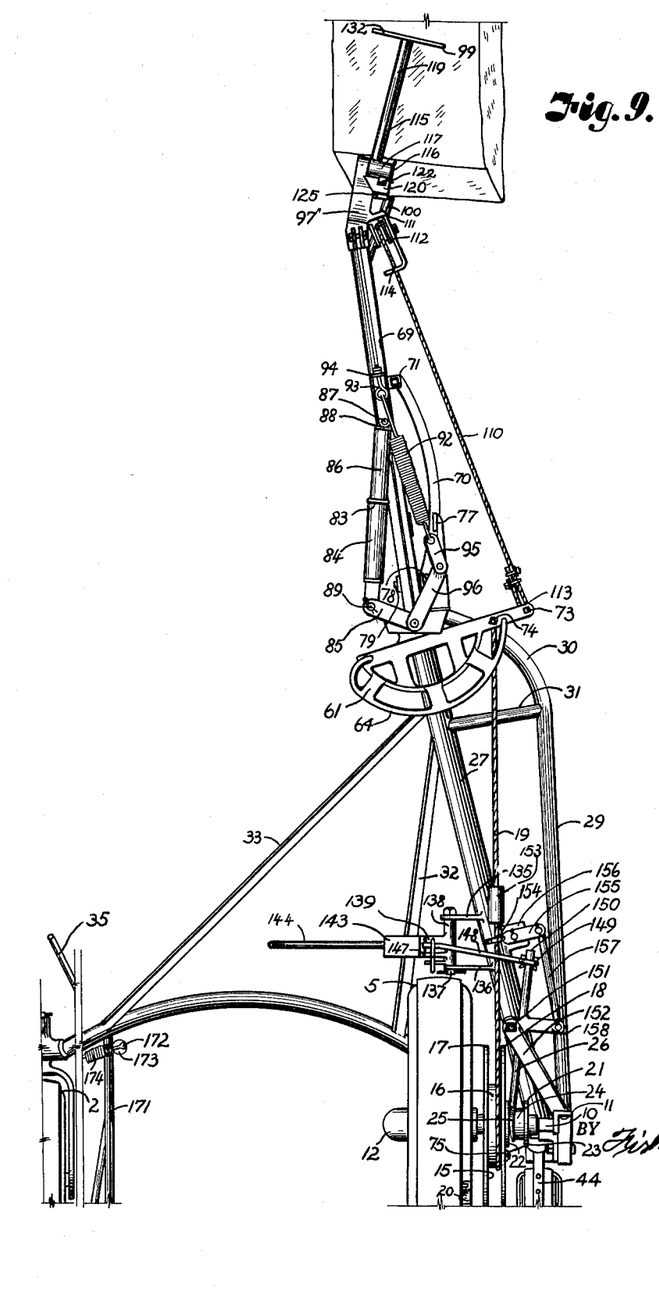
Fig. 9 is an end elevational view similar to Fig. 3 but showing the bale lifted and prior to release of the grippers.
Figure 10:
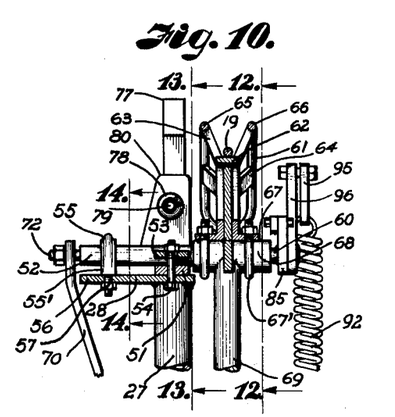
Fig. 10 is a section similar to Fig. 7, but taken on the line 10—10 of Fig. 12.

In using the loader for loading bales from the field into a truck or similar vehicle, the draft bar 41 is secured to a part of the vehicle as shown in Fig. 1, so that when the truck is moved along a row of bales the arch 6 passes over the bales and the bales are guided into position to be connected by the prongs 133 and 134. Resistance to movement of the bale causes the arm 69 to swing rearwardly with forward movement of the loader. This swinging movement is permitted by the slight teeter of the shaft across the bar 51, as shown in Fig. 11. The movement of the depending arm 69 pushes the rod 144 to swing the member 139 on the pin 137. This movement of the member 139 actuates the shifting lever 26 so that the forked end 25 moves the reel 15 in the direction of the main traction wheel 5. The lugs 20 are thus brought into engagement with one of the lugs 14 so that the reel rotates with the traction wheel. This movement of the reel winds the cable 19 on the drum 16 thereof and thereby starts actuation of a rocker 61. Initial movement of the rocker effects a pull on the cable 110 which, through the link 109 and arm 106, swings the gripper 98 into contact with the opposite end of the bale so that the spikes 102 and 103 cooperate with the spikes of the gripping member 99 in gripping the bale therebetween. Continued movement of the rocker maintains the grip on the bale and the arm 69 is swung upwardly to carry the bale therewith and into a position above the bed of the truck. During the final upward movement of the arm 69 the lug 76 thereon contacts the bumper 77 to compress the spring 78. At this point the stop 153 on the cable 19 engages the eye of the lever 155 to move the shift lever 26 in the opposite direction by means of the link connection 157 with the arm 158. This movement causes the shifting lever 26 to move the reel 15 retractively along the shaft 10 so that the lugs 20 thereon disengage from contact with one of the lugs 14 on wheel. The tension is then released on the cable 19 and 110 so that the spring 107 is effective in moving the gripper 98 out of contact with the bale to permit the bale to carry into the truck. When the bale is released, the stored up action in the spring 78, starts the return movement of the arm 69. The arm 69 continues its return movement under the checking action of the check 83 and spring 92 until it is in its original position and the shaft 52 is substantially horizontal, as shown in Figs. 7 and 10.

The arm 69 is also checked upon engagement with the resiliently supported bumper bar 42. The parts are now restored to their original position and ready for lifting another bale. After a succeeding bale is guided along the rail 42, the end of that bale comes into contact with the gripper 99 to again start the mechanism into operation and effect elevation thereof into the bed of the truck, as previously described. In case a bale is transversely of the front caster wheel it is engaged by the spike 165 which causes the bale to turn as the bale slides around the curved arm 167. When the truck is loaded the loader is readily disconnected therefrom for attachment to another truck or vehicle.

The loader is easily moved from one place of operation to another field by attaching the draft bar or tongue to the rear bumper of a motor car, draw bar of a tractor or other vehicle.

If a bale happens to be frozen to the ground, or the bale is engaging a rock, stump, or other obstruction or the gripper itself engages any obstruction the spring 127 yields and permits the latch member to pivot and allow the arm 131 to slide out of contact with the arm 130. The gripper is then free to swing retractively and ride over the top of the stuck bale or obstruction without causing any damage to the loader. After the safety trip has been released it then becomes necessary to reengage the parts to restore function of the gripper 99.

What I claim and desire to secure by Letters Patent is:

1. A loader including a mobile frame having a traction wheel, an up-right carried by the mobile frame, a rocker, means mounting the rocker for oscillatory movement on the up-right in both longitudinal and transverse directions relative to travel of the loader, an arm movably with and depending from the rocker and having forwardly and rearwardly extending portions, grippers having pivotal support on said portions with the rear gripper in position to engage the rear end of a bale and the front member in position to clear the bale, means connecting the forward gripper with the rocker to effect engagement of said forward gripper with the bale upon movement of the rocker in a transverse directions, a reel, means supporting the reel in coaxial alignment with the traction wheel, a cable connecting the rocker with the reel, clutch means on the reel and traction wheel for effecting a driving connection between the reel and the traction wheel to wind the said cable on the reel for swinging said arm to carry the bale to a position above the bed of a vehicle with which the loader is adapted to be associated, and means responsive to movement of the rocker in said longitudinal direction to actuate said clutch means.

2. A loader including a mobile frame having a traction wheel, an up-right carried by the mobile frame, a rocker, means mounting the rocker for oscillatory movement on the up-right in both longitudinal and transverse directions relatively to travel of the loader, an arm movably with and depending from the rocker and having forwardly and rearwardly extending portions, grippers having pivotal support on said portions, with the rear gripper in position to engage the rear end of a bale and the front member in position to clear the bale, means connecting the forward gripper with the rocker to effect engagement of said forward gripper with the bale upon movement of the rocker in a transverse direction, a reel, means supporting the reel in coaxial alignment with the traction wheel, a cable connecting the rocker with the reel, a clutch means on the reel and traction wheel for effecting a driving connection between the reel and the traction wheel to wind the said cable on the reel for swinging said arm to carry the bale to a position above the bed of a vehicle with which the loader is adapted to be associated, means responsive to movement of the rocker in said longitudinal direction to actuate said clutch means, and means having contact with a part on said cable for releasing the clutch means from driven connection with the traction wheel.

3. A loader including a mobile frame having a traction wheel, an up-right carried by the mobile frame, a rocker, means mounting the rocker for oscillatory movement on the up-right in both longitudinal and transverse directions relatively to travel of the loader, an arm movably with and depending from the rocker and having forwardly and rearwardly extending portions, grippers having pivotal support on said portions, with the rear gripper in position to engage the rear end of a bale and the front member in position to clear the bale, means connecting the forward gripper with the rocker to effect engagement of said forward gripper with the bale upon movement of the rocker in a transverse direction, a reel, means supporting the reel in coaxial alignment with the traction wheel, a cable connecting the rocker with the reel, a clutch means on the reel and traction wheel for effecting a driving connection between the reel and the traction wheel to wind the said cable on the reel for swinging said arm to carry the bale to a position above the bed of a vehicle with which the loader is adapted to be associated, means responsive to movement of the rocker in said longitudinal direction to actuate said clutch means, means having contact with a part on said cable for releasing the clutch means from driven connection with the traction wheel, and means for returning said gripper carrying arm to bale pick up position.

4. A bale loader including a mobile frame having a traction wheel, an up-right carried by the frame, a rocker, means mounting the rocker for oscillatory movement on the up-right in a transverse direction, an arm movable with and depending from the rocker and having forwardly and rearwardly extending arms, grippers having pivotal support on the respective ends of the arms with the rear member in position to engage the rear end of a bale and the front member in position to clear the bale, means connecting the forward gripper with the rocker to effect engagement of the gripper with the bale upon movement of the rocker in said transverse direction responsive to movement of the rocker in a longitudinal direction upon engagement of the bale by the rear gripper, a reel, means supporting the reel in coaxial alignment with the traction wheel, a cable connecting the rocker with the reel, clutch engaging means on the reel and traction wheel for driving the reel by the traction wheel to wind the said cable on the reel for swinging said arm to carry the bale to a position above the up-right, means responsive to movement of the arm in a rearward direction to actuate the clutch means for effecting movement of said arm from bale engaging to said elevated position.

5. A bale loader including a mobile frame having a traction wheel, an up-right carried by the frame, a rocker, means mounting the rocker for oscillatory movement on the up-right in a transverse direction, an arm movable with and depending from the rocker and having forwardly and rearwardly extending arms, grippers having pivotal support on the respective ends of the arms with the rear member in position to engage the rear end of a bale and the front member in position to clear the bale, means connecting the forward gripper with the rocker to effect engagement of the gripper with the bale upon movement of the rocker in said transverse direction upon engagement of the bale by the rear gripper, a reel, means supporting the reel in coaxial alignment with the traction wheel, a cable connecting the rocker with the reel, a clutch engaging means on the reel and traction wheel for driving the reel by the traction wheel to wind the said cable on the reel for swinging said arm to carry the bale to a position above the up-right, means responsive to movement of the arm in a rearward direction to actuate the clutch means for effecting movement of said arm from bale engaging to said elevated position, and means for returning the arm to bale engaging position.

6. A bale loader including a mobile frame having a traction wheel, an up-right carried by the frame, a rocker, means mounting the rocker for oscillatory movement on the up-right in a transverse direction, an arm movable with and depending from the rocker and having forwardly and rearwardly extending arms, grippers having pivotal support on the respective ends of the arms with the rear member in position to engage the rear end of a bale and the front member in position to clear the bale, means connecting the forward gripper with the rocker to effect engagement of the gripper with the bale upon movement of the rocker in said transverse direction, a reel, means supporting the reel in coaxial alignment with the traction wheel, a cable connecting the rocker with the reel, a clutch engaging means on the reel and traction wheel for driving the reel by the traction wheel to wind the said cable on the reel for swinging said arm to carry the bale to a position above the up-right, means responsive to movement of the arm in a rearward direction to actuate the clutch means for effecting movement of said arm from bale engaging to said elevated position, means for returning the arm to bale engaging position, and a shock absorber having connection with the arm for checking movement of the arm.

7. A bale loader including a mobile frame having a traction wheel, an up-right carried by the frame, a rocker, means mounting the rocker for oscillatory movement on the up-right in both longitudinal and transverse directions, an arm movable with and depending from the rocker and having forwardly and rearwardly extending arms, grippers having pivotal support on the respective ends of the arms with the rear member in position to engage the rear end of a bale and the front member in position to clear the bale, means connecting the forward gripper with the rocker to effect engagement of the gripper with the bale upon movement of the rocker in a transverse direction, a reel, means supporting the reel in coaxial alignment with the traction wheel, a cable connecting the rocker with the reel, a clutch engaging means on the reel and traction wheel for driving the reel by the traction wheel to wind the said cable on the reel for swinging said arm to carry the bale to a position above the up-right, means responsive to movement of the arm in a rearward direction to actuate the clutch means for effecting movement of said arm from bale engaging to said elevated position, means for returning the arm to bale engaging position, a shock absorber having connection with the arm for checking return movement of said arm, means for effecting disengagement of the clutch means, and a trip on said cable for engaging said last named means for disengagement of the forward gripper to drop the bale to permit return of the arm and gripping members carried thereby to bale pick-up position.

8. In a loader a longitudinal member, a caster wheel supporting the forward end of the longitudinal member, a traction wheel supporting the rear of the longitudinal member, an arch extending laterally from the longitudinal member to provide a bale pass beneath said arch, a caster wheel supporting the outer end of the arch, means on the longitudinal member for picking up and elevating bales, means on the first named caster wheel for straightening bales relatively to said bale pick up and said elevating means, and means actuated by the traction wheel for operating the bale pick up and elevating means.

9. A loader for picking up bales from the ground and loading them onto the bed of a vehicle, said loader including a frame for movement forwardly alongside of the vehicle, gripping means for engaging a bale, means carrying the gripping means on said frame for lateral swinging movement about an axis parallel with the direction of travel of the frame from a position for contact with the bale and to carry the bale laterally and upwardly to an elevated position above the bed of the vehicle, means for pivoting the carrying means on the frame for rocking movement of the gripping means in a rearward direction relatively to said travel on contact with the bale, operating means responsive to said forward movement of the frame, means responsive to said rocking movement to render the operating means effective to close the gripping means on the bale and for effecting said lateral swinging movement of the gripping means to carry the gripped bale into position over the vehicle, and means responsive to final movement of the gripping means for releasing the operating means for return of the gripping means to said initial bale-engaging position.

10. A loader for picking up bales from the ground and loading them onto the bed of a vehicle, said loader including a frame for movement forwardly alongside of the vehicle, gripping means for engaging a bale, an arm carrying the gripping means, a shaft having rocking support transversely of the frame, means oscillatably supporting said arm on one end of the rock shaft for carrying the gripping means on said frame for lateral swinging movement about the axis of the rock shaft to carry the bale engaged by the gripping means laterally and upwardly to an elevated position above the bed of the vehicle, operating means responsive to said movement of the frame for actuating said arm, means responsive to said rocking movement of the rock shaft to render the operating means effective to close the gripping means on the bale and to effect said lateral swinging movement of the arm to carry the gripped bale into position over the vehicle, and means responsive to final movement of the arm for releasing the bale and disconnecting the operating means for return of the gripping means to said initial bale-engaging position.

11. A loader including, a mobile frame, an upright carried by the mobile frame, a rocker, means mounting the rocker for oscillatory movement on the upright, an arm movable with and depending from the rocker and having forwardly and rearwardly extending portions, grippers having pivotal support on said portions with the rear gripper in position to engage the rear end of a bale and the front gripper in position to clear the bale, a cable connecting the front gripper with the rocker to effect engagement of said forward gripper with the bale upon initial operation of the rocker, a cable operating over the rocker, and means for winding an unwinding the last-named cable to actuate the rocker for lifting a bale engaged by the grippers.

12. A loader including, a mobile frame including a traction wheel, an upright carried by the mobile frame, a rocker, means mounting the rocker for oscillatory movement on the upright in both longitudinal and transverse directions relatively to travel of the loader, an arm movable with and depending from the rocker and having forwardly and rearwardly extending portions, grippers having pivotal support on said portions with the rear grippers in position to engage the rear end of a bale and the front gripper in position to clear the bale, a cable connecting the front gripper with the rocker to effect engagement of said forward gripper with the bale upon movement of the rocker, a cable operating over the rocker, means for winding and unwinding the last-named cable to actuate the rocker, a clutch connecting the cable winding means with the traction wheel, and means responsive to rocking movement of the rocker in the longitudinal direction under contact of the rear gripper with the bale.

13. A loader for picking up bales from the ground and loading them onto a vehicle, said loader including a frame for movement along side the vehicle and parallel therewith, said frame having a standard extending upwardly along side the vehicle, an arm having one end pivotally connected with the upper end of the standard on an axis extending in the fore and aft direction of the movement of the loader and depending therefrom, gripping means carried on the lower end of said arm and in a position to engage the respective ends of a bale on the ground, a head on the upper end of the arm and arranged transversely of said pivotal axis, actuating means operable responsive to forward movement of the vehicle, means connecting the head with the actuating means, and means responsive to engagement of the gripping means with the bale for rendering the actuating means effective for effecting swinging movement of the arm laterally and upwardly about said axis for carrying the bale from the ground discharging the bale directly onto the vehicle.

14. A loader for picking up bales from the ground and loading them onto a vehicle, said loader including a frame for movement along side the vehicle and parallel therewith, said frame having a standard extending upwardly along side the vehicle, an arm having one end pivotally connected with the upper end of the standard on an axis extending in the fore and aft direction of the movement of the loader and depending therefrom, gripping means carried on the lower end of said arm and in a position to engage the respective ends of a bale on the ground, a head on the upper end of the arm and having an arcuate track extending transversely of said pivotal axis, a flexible member extending over the arcuate track and having one end fixed to said head on the side of the axis opposite the vehicle, actuating means operable responsive to forward movement of the vehicle, means connecting the other end of the flexible member with the actuating means, and means responsive to engagement of the gripping means with the bale for rendering the actuating means effective in swinging the arm laterally and upwardly about said axis for carrying the bale from the ground discharging the bale directly onto the vehicle.

15. A loader for picking up bales from the ground and loading them onto a vehicle, said loader including a frame for movement along side the vehicle and parallel therewith, said frame having a longitudinal member and a standard extending upwardly from the longitudinal member and along side the vehicle, a caster wheel to carry the forward end of the longitudinal member, a traction wheel carrying the rear end of the longitudinal member, an arm having one end pivotally connected with the upper end of the standard on an axis extending in the fore and aft direction of the movement of the loader and depending therefrom, gripping means carried on the lower end of said arm and in a position to engage the respective ends of a bale on the ground, a guide rail extending along the longitudinal member of the frame for positioning the bale for engagement by the gripping means, a spike projecting forwardly of the front caster wheel to engage and turn the bale in parallel with the guide rail, a head on the upper end of the arm and arranged transversely of said pivotal axis, actuating means operable responsive to forward movement of the traction wheel, means connecting said head with the actuating means, and means responsive to engagement of the gripping means with the bale for rendering the actuating means effective for swinging the arm laterally upwardly about said axis for carrying the bale from the ground discharging the bale directly onto the vehicle.

References Cited in the file of this patent

UNITED STATES PATENTS

| | | |
|---|---|---|
| 1,019,344 | Myers | Mar. 5, 1912 |
| 1,275,680 | Harsh | Aug. 13, 1918 |
| 2,531,070 | McDermott | Nov. 21, 1950 |
| 2,597,220 | Appel | Mar. 20, 1952 |
| 2,634,003 | Williamson et al. | Apr. 7, 1953 |